United States Patent
Newell

(10) Patent No.: US 11,894,994 B2
(45) Date of Patent: Feb. 6, 2024

(54) NETWORK TRAFFIC IDENTIFICATION DEVICE

(71) Applicant: Redfig Consulting Pty Ltd, Collingwood (AU)

(72) Inventor: Gavan Newell, Collingwood (AU)

(73) Assignee: Redfig Consulting Pty Ltd, Collingwood (AU)

(*) Notice: Subject to any disclaimer, the term of this patent is extended or adjusted under 35 U.S.C. 154(b) by 0 days.

(21) Appl. No.: 17/784,442

(22) PCT Filed: Dec. 9, 2020

(86) PCT No.: PCT/AU2020/051339
§ 371 (c)(1),
(2) Date: Jun. 10, 2022

(87) PCT Pub. No.: WO2021/113904
PCT Pub. Date: Jun. 17, 2021

(65) Prior Publication Data
US 2023/0052712 A1    Feb. 16, 2023

(30) Foreign Application Priority Data
Dec. 11, 2019   (AU) ............................... 2109904689

(51) Int. Cl.
*H04L 12/00*    (2006.01)
*H04L 43/022*   (2022.01)
(Continued)

(52) U.S. Cl.
CPC ............ *H04L 43/022* (2013.01); *H04L 43/04* (2013.01); *H04L 43/062* (2013.01)

(58) Field of Classification Search
CPC ..... H04L 43/022; H04L 43/04; H04L 43/062; H04L 67/1023; H04L 43/12; H04L 45/74;
(Continued)

(56) References Cited

U.S. PATENT DOCUMENTS

| 7,719,966 B2 * | 5/2010 | Luft | ............... H04L 41/0896 370/230.1 |
| 8,151,019 B1 * | 4/2012 | Le | ............... H04L 47/2441 710/52 |

(Continued)

FOREIGN PATENT DOCUMENTS

WO    WO-2021113904 A1 *   6/2021   ........... H04L 43/022

OTHER PUBLICATIONS

Australian Patent Office, International Search Report for PCT Application PCT/AU2020/051339 dated Jan. 25, 2021, 4 pages.

*Primary Examiner* — Frantz Coby
(74) *Attorney, Agent, or Firm* — Sunstein LLP

(57) ABSTRACT

A network traffic device comprising: at least one network device adapted to receive network data packets; wherein said at least one network device filters network data packets to locate at least one identifying packet, and samples said network data packets to select at least one sample packet. The at least one network device may transfer said at least one identifying packet and said at least one sample packet to an analyser. A predetermined sample rate may determine the number of sample packets selected by said at least one network device.

20 Claims, 18 Drawing Sheets

(51) Int. Cl.
*H04L 43/04* (2022.01)
*H04L 43/062* (2022.01)

(58) Field of Classification Search
CPC ... H04L 47/2441; H04L 43/18; H04L 43/028;
H04L 43/024; H04L 43/08; H04L 43/026;
H04L 43/14; H04L 69/22
USPC .................................................. 709/220, 223
See application file for complete search history.

(56) References Cited

U.S. PATENT DOCUMENTS

| | | | |
|---|---|---|---|
| 9,071,542 B2* | 6/2015 | Jackowski | H04L 69/22 |
| 9,985,800 B2* | 5/2018 | Haney | H04L 63/0209 |
| 2005/0190695 A1* | 9/2005 | Phaal | H04L 43/065 |
| | | | 370/229 |
| 2007/0160073 A1* | 7/2007 | Toumura | H04L 43/028 |
| | | | 370/351 |
| 2009/0116398 A1* | 5/2009 | Shi | G06F 11/348 |
| | | | 370/252 |
| 2011/0242994 A1* | 10/2011 | Carvalho | H04L 43/026 |
| | | | 370/252 |

* cited by examiner

NETWORK TRAFFIC IDENTIFICATION DEVICE

CROSS-REFERENCE TO RELATED APPLICATIONS

This application is a national phase entry of International Patent Application No. PCT/AU2020/051339 filed Dec. 9, 2020, which in turn claims priority to Australian Patent Application No. 2019904689, filed Dec. 11, 2019. Each of the above-described applications is incorporated herein by reference in its entirety.

FIELD OF THE INVENTION

The present invention relates to the identification of traffic on a network and in particular to processing of data at line-rate speeds.

BACKGROUND TO THE INVENTION

Various networking protocols divide a message, or data, into small packets, which are each transmitted to a destination address. The path each packet takes to the destination address may not be the same, nevertheless when they arrive they are reassembled to recreate the original message.

Each packet will have a header and optionally a payload. The payload can contain the application specific data which is being sent. The header includes several identifying details such as the source address of the packet, the destination address the packet is going to, and the protocol and port. The header can also include other attributes such as the packet length and protocol metadata, among other details.

The multiple packets of the data to be sent for an application are considered a stream of packets and form a flow. The payload of a flow is the combined payload of all the packets, and it is this combined payload that once reconstituted reflects the original data that was transmitted. Each of the packets in the flow will have the same source address, destination address and protocol. Other attributes may also be available, such as, for example the port.

Knowing the source and destination addresses allows the networks the flow is travelling between to be identified. Similarly, the type of service of a flow can be determined by the protocol and port. Specific port numbers are usually allocated for common services and applications. For example, port 25 in the Transmission Control Protocol (TCP) refers to Simple Mail Transfer Protocol (SMTP), and is used for routing emails between servers. Similarly, port 80 in TCP refers to Hypertext Transfer Protocol (HTTP) and is used for web services.

Packets are routed across a network by different devices, including address routing switches which look at the destination address of the packet, and flow routing switches that look at the source/destination address and/or protocol and port.

These routers and switches are specialised in performing specific tasks (routing and switching) with very high performance. For example a small (1 rack unit) data centre switch may have 32 ports each capable of 100 Gbps line-rate wire speeds, giving a bidirectional bandwidth and throughput of 6.4 Tbps with a fixed port-to-port latency. This is achievable because the switch hardware uses an Application Specific Integrated Circuit (ASIC) dedicated to, and specialised for, the switching task.

These speeds are not achievable with general purpose processors, such as the x86 processor, without sacrificing throughput performance.

There will also usually be other appliances within a computer network that perform other specialised functions, such as firewalls, WAN optimisation, deep packet inspection (DPI) or other network functions. Because of the more complex nature of these specialised functions, these appliances cannot achieve the same bandwidth and throughput as the ASIC based switches. For example a top of the range Fortinet model 3980E next generation firewall occupies five rack units, has ten ports capable of 100 Gbps speeds but only 28 Gbps of NGFW (Next Generation Firewall) throughput with an enterprise traffic mix.

The disparity between the throughput of the data centre core switches and network appliances means that, for economical and logistical reasons of cost and scale, it is impractical to deploy some network appliances or functions across the entirety of a large network. As networks grow in size the core of the network tends to be comprised only of switches and routers, with network appliances on the boundaries of the network or between networks such as a DMZ or perimeter network. This is particularly true of telecommunications and data centre networks.

This particular problem, of the core switch throughput being so much greater than that of network appliances, is well known.

For the particular scenario of Deep Packet Inspection (DPI) a known solution to the problem is to bypass traffic. With this solution network switches either side of the DPI appliance only route certain traffic through the appliance, and bypass the rest around it. The idea is to reduce the amount of network traffic flowing through the DPI system, which has limited throughput. However the problem with this approach is that the network switches can only route traffic based on the information contained in packet headers, and this level of granularity isn't sufficient.

To elaborate on this point consider a typical mix of Internet traffic the majority of which is HTTPS (Hypertext Transfer Protocol Secure) followed by HTTP and QUIC (Quick User Datagram Protocol Internet Connections). A possible breakdown of Australian Internet traffic could be 55% streaming video, 20% general web browsing, 15% downloads and 10% other. Streaming video is delivered over HTTPS and QUIC, general browsing HTTPS and HTTP, downloads HTTPS and HTTP with other being a mix. The network switches can only differentiate traffic by the protocol port (HTTPS/HTTP/QUIC) and source/destination IP address ranges. To have the most benefit from the DPI solution, streaming video would be bypassed, however it is not possible to reliably separate streaming video out from other HTTPS and QUIC traffic without inspecting the packet payloads—something that traditional network switches cannot do.

To further elaborate consider the case of encrypted traffic such as a HTTPS or QUIC stream. A DPI solution deployed in a non-corporate environment (where decryption of the traffic is not possible) can only extract information from the non-encrypted headers of the HTTPS and QUIC stream. In particular the Transport Layer Security (TLS) certificate information and the Server Name Indication (SNI) fields are of use in determining which application/domain the stream is associated with. This information is available in typically one particular packet within the stream, namely the identifying packet. The remainder of the packets in the stream are encrypted and unintelligible, useful only to measure the number of packets and the size of the stream.

Long-lived streams ("elephant flows") such as downloads or streaming video are comprised of hundreds or thousands of packets over an extended period of time, and take up disproportionally more bandwidth than short-lived steams ("mice flows") such as general web browsing.

This places a significant load on the DPI appliance, due mainly to the underlying problem that the capacity of core switch technology cannot be realised due to the limitations of network appliances.

Another problem for network management is attempting to identify certain usage. For example, consider the data flows set out in FIG. 1. Set out are four data flows relating to traffic from Netflix 80, Facebook 79, YouTube 77 and general emails 78 that are transmitted across a network link 82. While not realistic for illustrative purposes assume that each data flow has only five packets. Each application has its identifying packet 32 and 35 as well as non-identifying packets 31. If the object is to identify usage of Facebook 35 then the obvious option is to adopt the solution of FIG. 2 and send every packet for analysis 83—that is applying DPI and looking at the full packet payload of every packet transmitted between source 10 and destination 14. This would be an expensive option and impractical for any network of significant size.

An alternative to the brute force option of FIG. 2, is to use address routing as shown in FIG. 3 where packets are filtered by network. In the example shown, all the traffic from the 10.0.0.0/8 network is sent for analysis 11. This can significantly reduce the amount of data that is to be analysed, but there is the obvious risk of the usage that is desired to be found being on a different network.

A further alternative is flow routing as shown in FIG. 4, where packets are filtered by service. In this case only web service packets are sent for analysis 11. In practice this is only marginally improved from the option of FIG. 2 given that the vast majority—perhaps 90%—of overall Internet traffic is web service related.

Therefore there exists a problem that the amount of data being transmitted results in an inability to identify specific use.

Another problem faced by network management is traffic analysis at scale. In datacentres and corporate networks it is desired to manage the data traffic on the network to reduce congestion and latency. In other words, to ensure the data is free flowing and the user experience is not negatively impacted. This could for example be a problem if a small number of elephant flows consume the available bandwidth, negatively impacting a large number of mice flows. The difficulty is that in order to manage network traffic, it is necessary to analyse the network traffic to determine any bottlenecks and network congestion.

Large networks and datacentres can have thousands of network links. Each of these links can run at high speeds of 10G to 100G+. Typically a diagnostic probe or TAP (test access point) hardware device is inserted at a specific point in the network to monitor the data. These probes are expensive, can only be attached to a single port and have limited throughput of around 100G.

The probe device 41 could be manually attached to a specific port 84 of the data centre network as shown in FIG. 5. The entire traffic on the port can then be analysed. The problem is that only a single port can be looked at, and it can be time consuming to change the probe to a different port 40. FIG. 6 shows an alternative approach of a TAP switch 86 where each port is attached to the dedicated TAP switch 86 and a probe device 41 is also attached to the switch 86. While it can be quicker to change links and which port is being analysed, the same problem exists that only a single port at a time can be reviewed 85. FIG. 7 replaces the TAP switch 86 with a TAP network 89, and rather than send entire traffic from a port or link, sends selected flows from multiple ports 87, 88 to the probe device. Like the limitations mentioned in relation to FIG. 4, the TAP network also has limitations of identifying which flow to transmit and the practicalities of being able to analyse the amount of data.

There is therefore a problem that network administrators are not able to proactively monitor and manage traffic flow. Rather they can only reactively trouble shoot once a problem presents.

There is thus a need for an alternative way to identify traffic on a network and preferably also take advantage of the throughput available with core switches.

SUMMARY OF THE INVENTION

In a broad form, there is provided a network device able to filter out identifying packets from network traffic, and also sample a predetermined proportion of packets from the network traffic.

In a first aspect, there is provided a network traffic device comprising:
  at least one network device adapted to receive network data packets;
  wherein the at least one network device filters network the data packets to locate at least one identifying packet, and samples the network data packets to select at least one sample packet.

The identifying packets and sample packets can then be sent to an analyser, which may carry out deep packet inspection (DPI) on the received packets.

It is expected that the network device will include a programmable application specific integrated circuit (ASIC), and operate exclusively in the data plane.

The number of sample packets selected by the network device can be based on a predetermined sample rate. The sample packet may be selected at random, or alternatively may be selected by selecting each Nth network data packet, where N is a predetermined number. N can be selected having regard to the desired sample rate.

Preferably the analyser will estimate (or substantially reconstruct) the flow information of the network data packets from the received packets and the predetermined sample rate, which may be around 4 or 5%. The device may also include a load balancer to determine which analyser each received packet is to be transferred to.

In another aspect the present invention provides a network traffic device comprising:
  at least one network device operating exclusively in the data plane, the at least one network device adapted to receive data packets from data streams forming network traffic; the at least one network device adapted to filter the data packets to locate each identifying packet, and sample the data packets to select a predetermined number of sample packets; and
  at least one analyser, adapted to perform deep packet inspection on received packets, the received packets comprising the at least one identifying packet and the at least one sample packet.

BRIEF DESCRIPTION OF THE DRAWINGS

An illustrative embodiment of the present invention will now be described with reference to the accompanying figures. Further features and advantages of the invention will also become apparent from the accompanying description.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The invention describes a novel approach to identifying traffic on a network. The system is able to operate at line rate speeds, and is thus able to avoid the bottlenecks faced by current techniques relying on known network appliances. In a preferred embodiment, the present invention sends a copy of network traffic through a device, that filters out the identifying packets and sends only those identifying packets to the DPI appliance. In the preferred arrangement the device will also sample the non-identifying packets and send a predetermined proportion, such as 1 in every 1,000 through to the DPI for counting or analysis. Advantageously the device can run at the speed of a network switch and send only the useful packets through to a DPI for processing.

The invention can utilise a programmable ASIC chip such as the Tofino available from Barefoot Networks. The ASIC chip can be programmed using a Software Development Kit (SDK) with the P4 programming language, and may run at line-rate speeds. The chip can function as a powered network switch, and can be configured to send a copy of packets that match specific packet header conditions and/or specific packet payload conditions to another device for processing/inspection.

Another embodiment of the invention is a server (x86 or similar) that processes and inspects the packets extracted by the chip. The output of this analysis process can be fed to other devices/systems, shown to operators and/or collected for later use.

Figure 8:
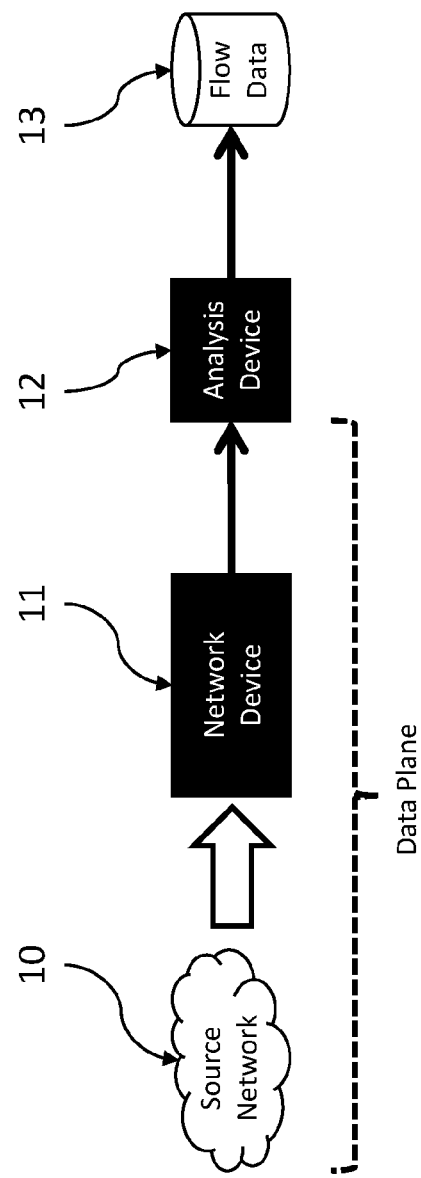
FIG. 8 demonstrates a possible hardware setup using the present invention.
Figure 9:
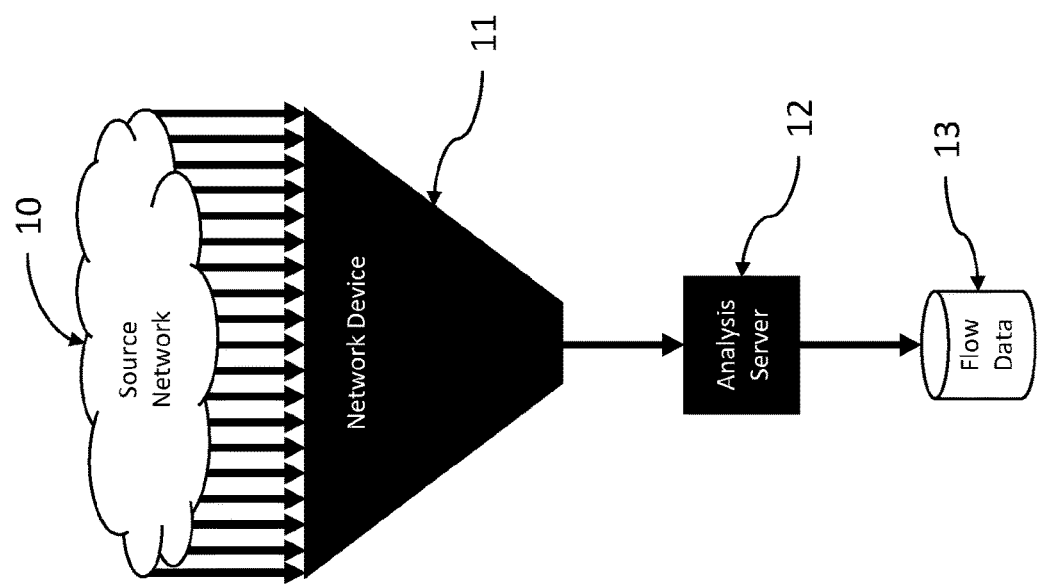
FIG. 9 shows an alternative view to FIG. 8, and exemplifies the ability of the present invention to scale up vertically.

In a basic arrangement, as shown in FIG. 8, an embodiment includes a hardware network device 11, including a fully programmable switching ASIC chip that operates at line-rate with multiple high-speed ports (e.g. 32×100 Gbps ports). The network device 11 will receive input(s) from a source network 10, for example either via SPAN (Switch Port Analyser) ports or optical TAPs. In an embodiment, the output of the network device 11 passes to an analysis device(s) 12 to process the identifying packet, and preferably the sampled packet stream to produce the desired analytical output 13.

In this arrangement, the source network 10 provides a copy of the network traffic into the network device 11. While this is not essential, as the network device 11 can pass-thru traffic when operating inline, it is applicable when operating out-of-band. The network device 11 could also be placed within the source network 10 itself and be performing traditional network switching functions in addition to the specific functionality of the present invention. In any event, the programmable network device 11 is receiving inputs from the source network 10.

The analysis device 12 is connected to the network device 11 to receive outputs post-filtering and after any packet encapsulation.

According to an embodiment, everything from the source network 10 through the network device 11 and up to but excluding the analysis device 12 operates in the data plane at line-rate. There is no control plane involvement required, removing a source of latency and a potential bottleneck. That is, the throughput equals the available bandwidth: there are no throughput limitations, and the network device 11 operates at line-rate. Accordingly, the analysis device(s) 12 should be scaled sufficiently to handle the configured amount of network traffic output by the network device 11 post-filtering. In this regard, the configuration could be altered by the operator as desired, and could allow anything from all packets to no packets to a proportion of packets to be passed through to the analysis device 12. The Applicant considers that for realistic scenarios a sampling rate of around 4% to 5% is sufficient to identify network flow applications and be able to accurately estimate network flow statistical information.

The network device 11 can be configured to act as a filter. For example, the network device 11 can be configured to receive a copy of every packet flowing through the source network 10 and only send the packets that match the filter criteria through to the analysis device 12.

A typical network device 11 may have 32 ports each operating at 100 Gbps speeds. One or two of these ports can be used as the output, providing up to 30 ports for inputs. Applying a sampling rate of 4% to the 30×100 Gbps inputs gives 3,000 Gbps*4%=120 Gbps output. Given that network links are typically only ever 80% utilised on average at peak, this becomes 120 Gbps*80%=96 Gbps output. This can be handled by a single 100 Gbps output port, and depending on the analysis device size, handled by one or more analysis devices 12.

Figure 10:
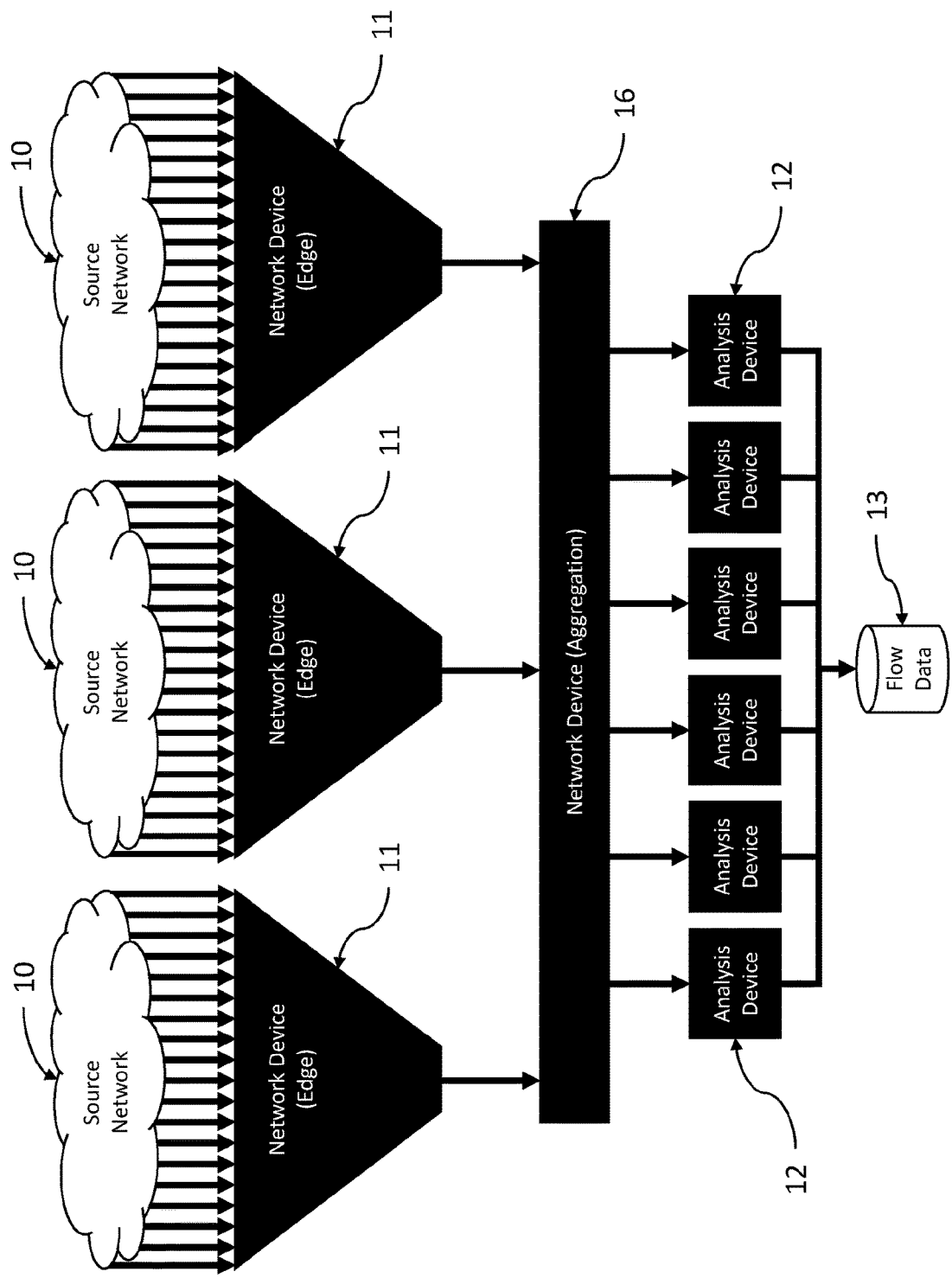
FIG. 10 exemplifies the ability of the present invention to scale out horizontally.

As the number of input ports increases the solution of the present invention can also scale by deploying more hardware and adding an intermediate tier. This is not an option with conventional systems. As shown in FIG. 10 multiple network devices 11 and 16 interconnect to receive and filter data from the source network 10 and distribute the filtered output across multiple analysis devices 12. This can scale horizontally as needed, until the aggregating network device 16 runs out of capacity. According to an embodiment, at this point the entire solution can be replicated to scale-out indefinitely, with flow data 13 records being deduplicated and merged as required.

Figure 11:
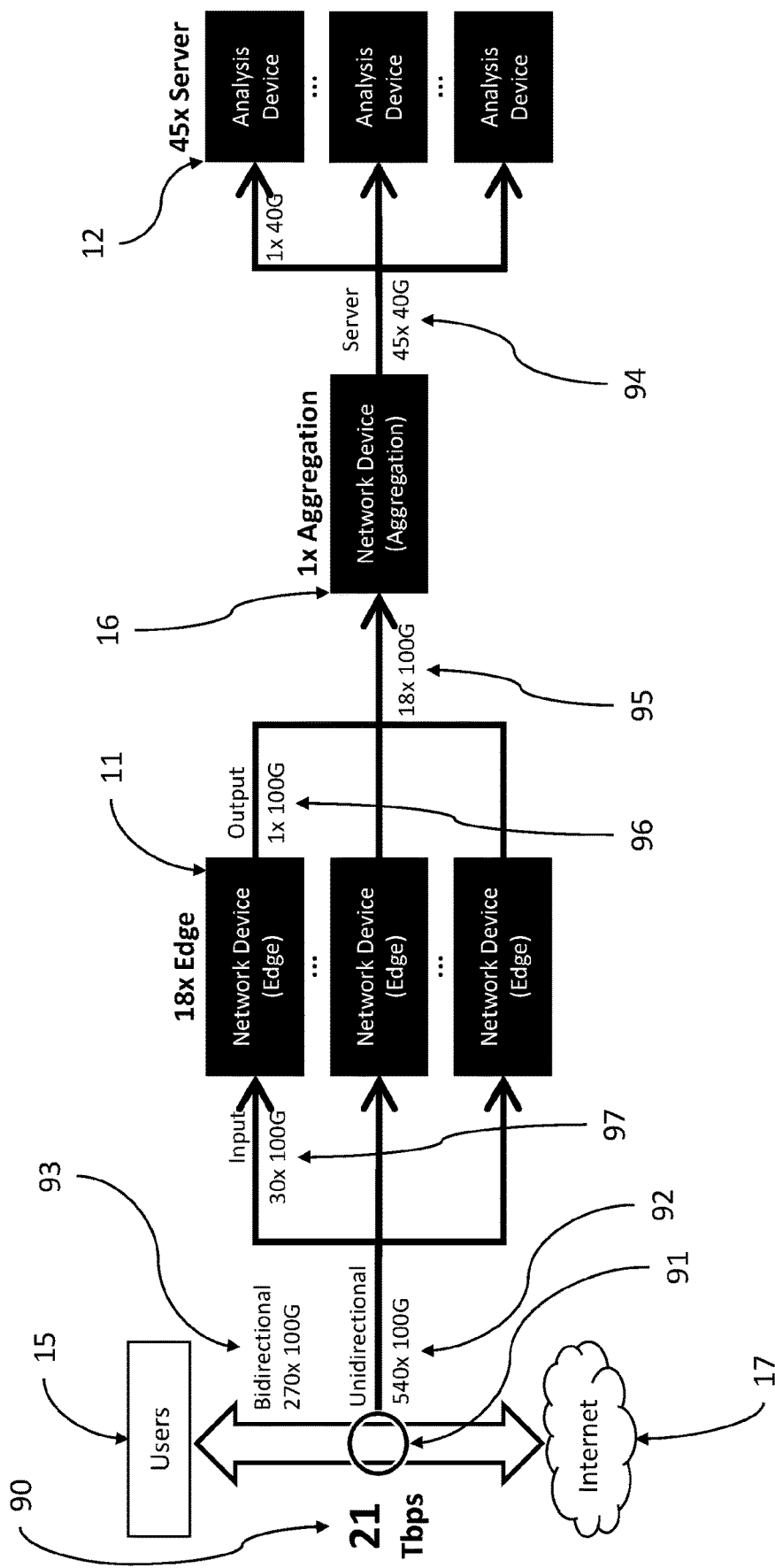
FIG. 11 demonstrates a possible system set up using the present invention.

To exemplify this, in FIG. 11 assume there is a network with 21 Tbps of traffic 90 flowing between users 15 and the Internet 17. This represents nearly double the Australian National Broadband Network's residential Internet connection capacity as of September 2019. For the purpose of the exercise assume the network has unrealistically high utilisation of 80% and the system is sampling at a rate of 4%. With this configuration, in the present invention, a copy 91 of the 21 Tbps of traffic flowing between users and the Internet is fed into 18× network devices 11 operating at the edge. Each 100 Gbps bidirectional link 93 translates into a pair of 100 Gbps unidirectional link inputs 92. Each of the edge programmable network switches filters and samples the data down 97 to approximately 96 Gbps of output 96. This is fed to the analysis devices 12 via an intermediary network device 16 performing an aggregation function. The requirement for 45× analysis devices assumes that each is only capable of processing 40 Gbps of network traffic, although typically they would have much greater capacity.

This may be favourable in comparison to currently available network packet broker solutions which are unable to perform the sampling of network packets. In order to attempt to replicate the present invention, a network packet broker arrangement would require the addition of 1,350× servers (each processing 40G of input) or dedicated 'service appliances'. Therefore, currently available network packet broker solutions can lead to a bottleneck as to sample all traffic at 4% requires, in addition to the network packet broker switches themselves, sufficient servers/service appliances to handle all of the network traffic flowing through the network.

The present invention is able to sample the packets, both randomly and picking out identifying packets, exclusively in the data plane at line-rate speeds while still performing cut-through processing. Advantageously, there may be no need to route to another device, sacrifice line-rate speeds, delay packets or involve the control plane, as in the case presently. In addition there is no limit to the number of flows being processed, as it is not a flow based solution.

Because existing analysis tools/probe devices expect to receive a complete feed of network traffic, rather than sampled data, the analysis device 12 of embodiments of the present invention receives a different data makeup. It receives the identifying packets as well as randomly sampled other packets, de-encapsulates them and performs analysis. Advantageously, this can produce flow data as well as other outputs.

The analysis device 12 can be implemented in a general purpose computer (x86), FPGA (field-programmable gate array) or dedicated hardware.

Switch Configuration

In an embodiment, the network devices 11 are configurable (e.g. via "tables") to enable identification of packets of interest and to determine how identified packets are to be handled.

Preferably a matching table will be configured that will match packets with specific headers of interest, and also ideally at least the first six bytes of the payload. The matching should be ternary/wildcard based for efficiency, although exact matching would also work. Ternary matching allows operators to easily configure "don't care" values rather than having to exhaustively list all possible matching values.

For example:

| Field | Type | Description |
| --- | --- | --- |
| EtherType | Packet Header Criteria | Packet EtherType |
| VLAN PCP | Packet Header Criteria | Packet VLAN priority code point |
| VLAN ID | Packet Header Criteria | Packet VLAN identifier |
| DSCP | Packet Header Criteria | Differentiated services code point for packet priority |
| Protocol | Packet Header Criteria | Packet IP protocol |
| Source Address Range | Packet Header Criteria | Packet source IP address range |
| Destination Address Range | Packet Header Criteria | Packet destination IP address range |
| Source Port Range | Packet Header Criteria | Range of values for TCP/UDP packet source port |
| Destination Port Range | Packet Header Criteria | Range of values for TCP/UDP packet destination port |
| Payload | Packet Header Criteria | Matching against at least the first 6 bytes of packet payload |
| Priority | Rule Priority | Priority of this rule vs other rules when multiple rules match |
| Sample Rate | Rule Action | Rate at which to sample matching packets |

Adopting the above matching table, matching rules to detect identifying packets for HTTP and HTTPS as well as sampling 4% of HTTP and HTTPS traffic (ignoring all other traffic) could be created as follows:

1. HTTP
    a. Select TCP packets with either source or destination port of 80 (HTTP) that have a payload starting with "GET/" (HTTP GET) and sample at 100% with rule priority 1
    b. Select TCP packets with either source or destination port of 80 (HTTP) and sample at 4% with rule priority 2
2. HTTPS
    a. Select TCP packets with either source or destination port of 443 (HTTPS) that have a payload first byte of 0x16 hexadecimal and a payload sixth byte of 0x01 hexadecimal (HTTPS ClientHello) and sample at 100% with rule priority 1
    b. Select TCP packets with either source or destination port of 443 (HTTPS) and sample at 4% with rule priority 2

The first rule in each set will extract all of the identifying packets, and the second rule in each set samples 4% of the non-identifying packets.

HTTP Identifying Packets

In an embodiment, for a HTTP connection, the present invention is interested in the packets that contain the Host header. In general a HTTP request starts by issuing a packet from client to server that contains either a GET, POST, PUT, DELETE, HEAD, OPTIONS, TRACE or PATCH request method. These appear at the start of the packet payload, so the system can match—with wildcards—such that packets that start with these terms are selected. It is possible that other packets may randomly start with these characters, but they are very infrequent and could be treated by the analysis servers as a random sample.

Figure 12:
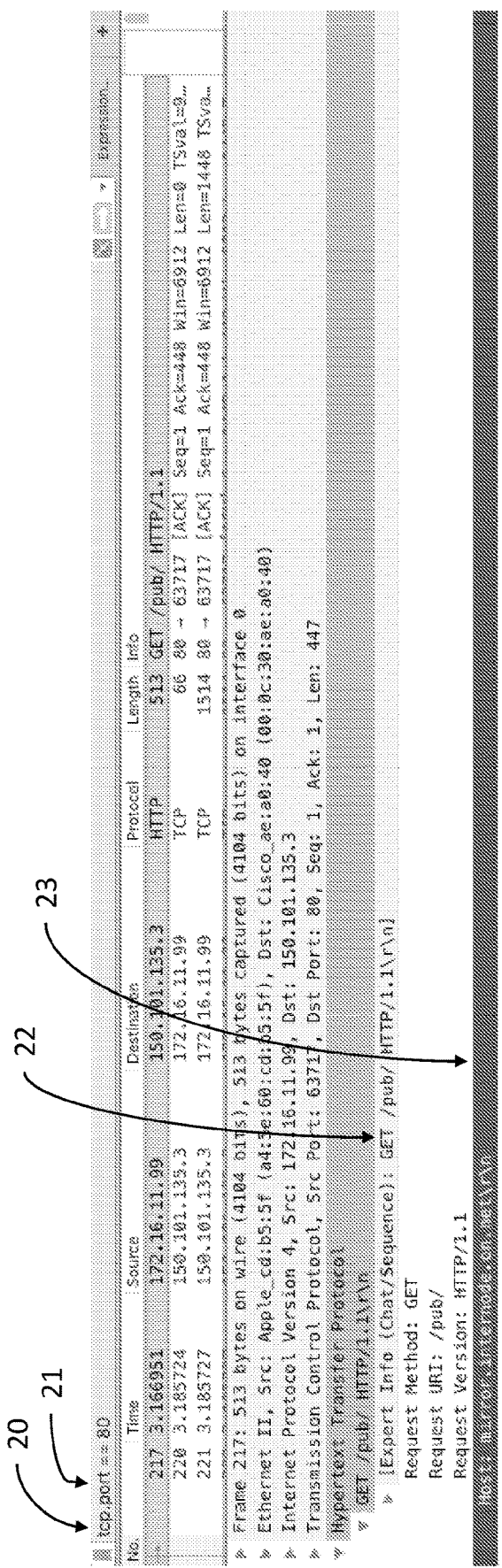
FIG. 12 shows a screenshot of a HTTP packet.

The screenshot of FIG. 12 shows a HTTP packet from a GET request. The packet protocol 20 is TCP, the destination port 21 is 80, and the first few bytes of the packet payload 22 are GET/. The filter could be applied in the network device 11 to send a copy of this packet to the analysis device 12. The analysis device 12 can then look deeper into the packet payload to find the Host: 23 to determine the name of the server the HTTP GET request was sent to.

As HTTP is unencrypted, the contents could be of interest. However in general most Internet traffic is encrypted. By applying random sampling to HTTP packets, the network device 11 is able to send a small representative portion of the HTTP packets to the analysis devices. This allows the analysis devices to estimate the number of packets in the flow, the size of the flow, when the flow started and when the flow finished. By knowing the sample rate applied to select a given packet, the analysis devices could estimate the number of packets in the flow and the size of the flow by simple extrapolation. For example if a packet is received with a 1 in 20 chance of being sampled, the system can add 20 to the number of packets in the flow and 20× the size of the packet to the size of the flow.

HTTPS Identifying Packets

In an embodiment, for HTTPS packets, the system is interested in the Server Name Indication field 24 present within the Client Hello 25 handshake packet, and/or the Common Name field present within the certificate that follows the Server Hello handshake packet.

HTTPS packets can be identified by the TCP protocol 20 and port 21 being 443. The Client Hello handshake packet is sent from client to server, so the destination port will be 443. The Server Hello handshake packet is sent from server to client, so the source port will be 443. The TLS handshake packets have a first payload byte of 0x16 hexadecimal (handshake) and a sixth payload byte of 0x01 hexadecimal (Client Hello) or 0x02 hexadecimal (Server Hello).

Figure 13:
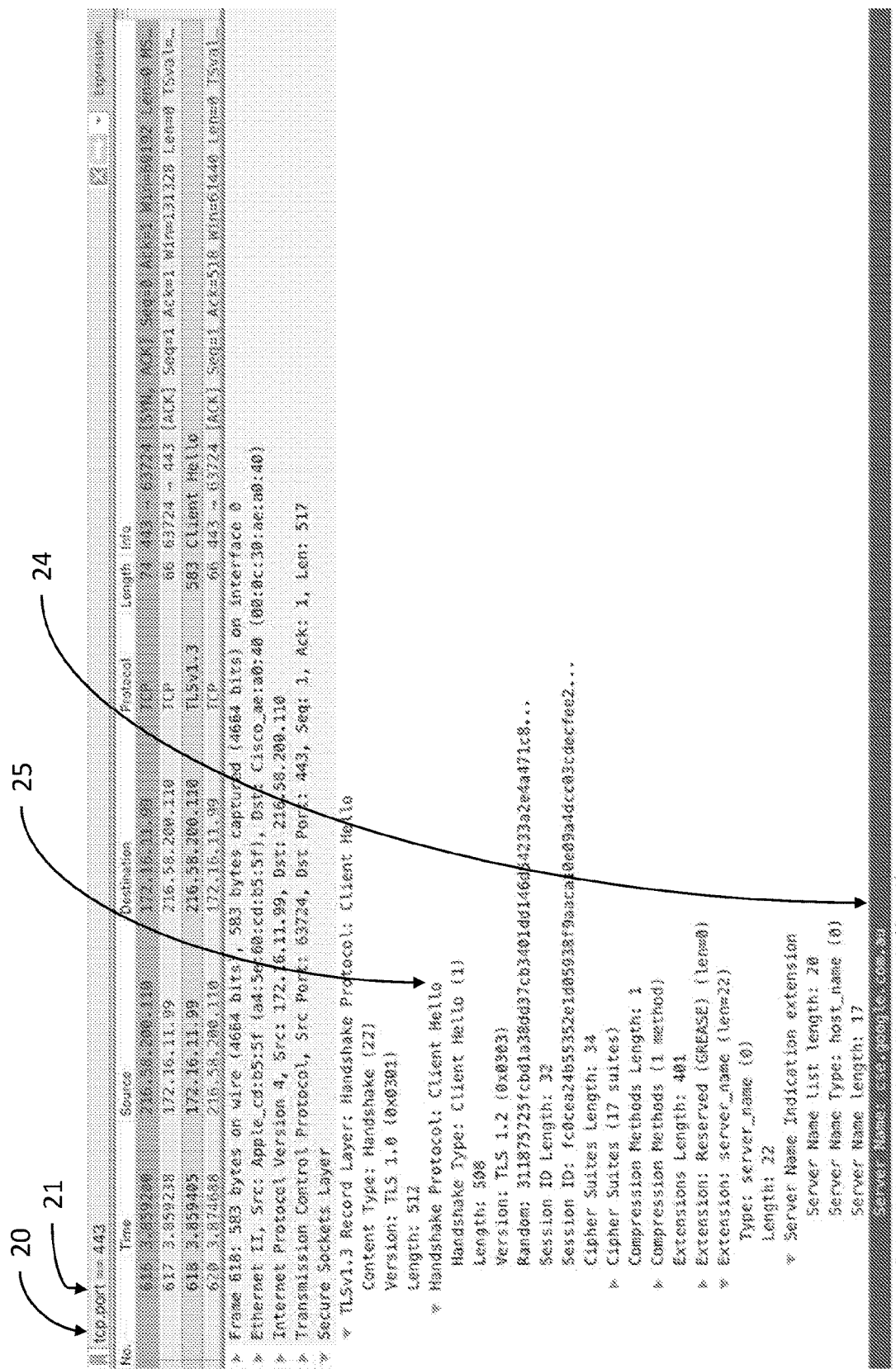
FIG. 13 shows a screenshot of a HTTPS packet.

FIG. 13 shows a screenshot showing a HTTPS network packet containing a Client Hello. Deeper within the payload of the packet the Server Name Indication 24 extension shows the name of the server that the request was sent to.

A similar approach can be used to identify identifying packets for other protocols such as QUIC. However, it will also be understood that other matching criteria could be used, such as packet signatures discovered by machine learning models.

Flow Hash

Once a packet has been selected by the matching table, and noting that if a rule has a sampling rate less than 100% then there is a chance it won't be sent through, a decision is made whether to send the packet to the analysis device 12. While a single analysis device 12 may be sufficient fora small network, in order for the present invention to scale horizontally, the system will ideally balance the load across multiple analysis device, in which case the system can determine which analysis device 12 to send the packet to.

In doing so it may be desired that all the packets of a single flow are sent to the same analysis device 12, so as to avoid correlation problems if packets of a single flow are sent to different analysis devices. To assist this process the preferred arrangement of the present invention computes a flow-hash of the packet.

Each flow can be uniquely identified by the protocol and source/destination addresses and source/destination ports. Although depending on the network additional packet headers, such as VLAN or MPLS tags, may also be required. Flows operate in both the upload and download direction (from client to server, and from server to client). Technically each is a separate flow. However, the system may prefer the packets from both the upload and download direction to be sent to the same analysis device 12. This is to more easily correlate the upload and download packets, and when an identifying packet is detected on, say, an upload flow the system can apply that information to the corresponding download flow at the same time.

The flow-hash may be computed by taking a one-way hash of the flow as follows:

1. If the protocol isn't TCP or UDP (which is relatively rare) then the system computes the flow-hash of the packet from the EtherType and Payload bytes 1 to 6. This will result in the packet being randomly distributed between the analysis devices.
2. The system then determines if the flow is an "upload" or "download" flow. This can be done in any deterministic manner. For TCP and UDP flows one option is to use the source port and destination port, and consider a flow to be an "upload" if the source port is higher than or equal to the destination port—otherwise it is a "download" flow.
3. If it is an "upload" flow the system computes the flow-hash from the Protocol, Source Address, Destination Address, Source Port and Destination Port.
4. If it is a "download" flow the system computes the flow-hash from the Protocol, Destination Address, Source Address, Destination Port and Source Port.

The order of the flow hash is reversed for each of the upload and download flows to ensure that the flow hash for the download flow will be identical to the corresponding upload flow. The actual flow hash value is not critical and alternative flow hashes could be used if desired. What is important is to ensure that the same hash value is outputted for a given flow regardless of which direction the packet is travelling in.

Once the flow hash has been determined the system can look up the output table to load-balance the packet.

Output Table

Where there are multiple analysis devices 12 the output table can be used to determine which analysis device 12 a given packet should be sent to for processing.

For example:

| Field | Type | Description |
| --- | --- | --- |
| Priority | Rule Priority | The priority of this rule used when multiple rules match |
| Flow Hash Range | Match Criteria | The range of flow hash values to match |
| Destination Port | Rule Action | The destination port/analysis device 12 to send the packet to |

With the above table the range of possible flow-hash values (e.g. 0 to 65535) could be entered, and a portion of this range associated with each available analysis device 12. Overlapping ranges can be permitted and ties can be broken using the rule priority, allowing removal of one analysis device 12 with a fallback to an alternative or default to ensure uninterrupted operation.

Network Devices

Figure 14:
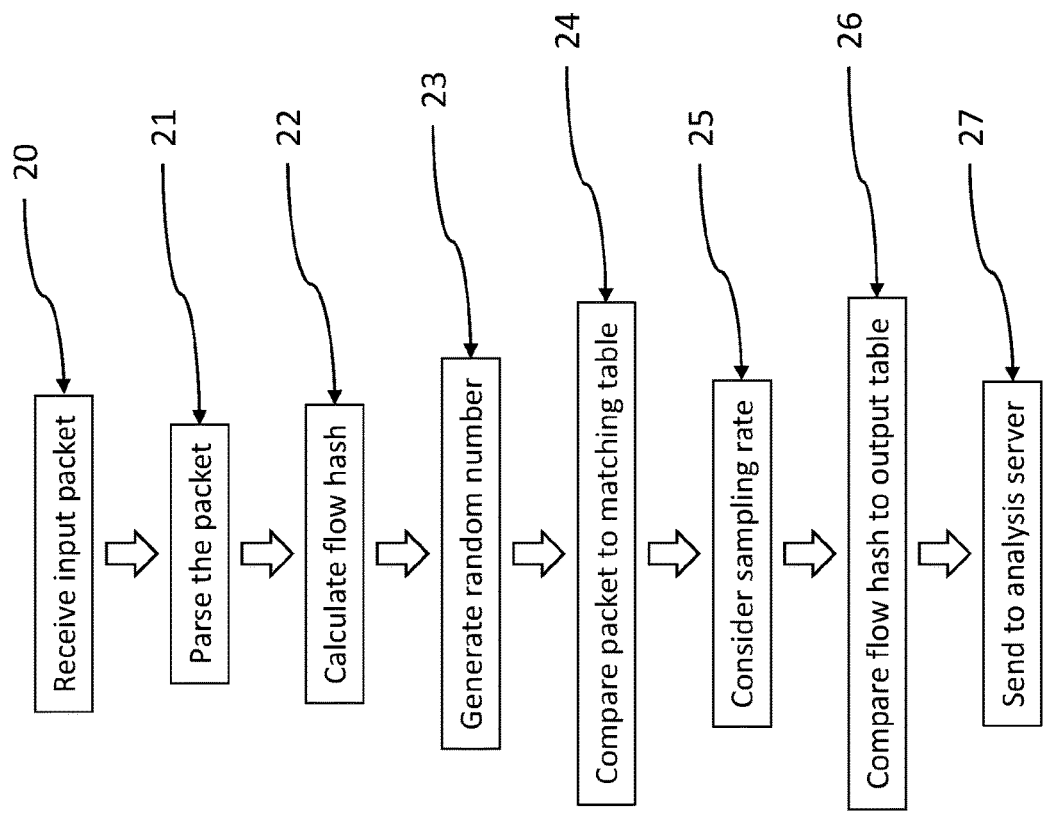
FIG. 14 shows a flow diagram of one approach to configure a programmable network switch in accordance with the present invention.

In the preferred arrangement the network devices can be configured in line with the flow chart of FIG. 14, although it will be understood alternative arrangements could be adopted. The network device 11 receives 20 the input packet, and then parses 21 the packet headers and packet payload, or preferably at least the first six bytes of the payload.

Ideally, at least the headers Ethernet, IPv4/IPv6, TCP/UDP, and the payload will be parsed.

The next step in the flow chart of FIG. 14 is to compute 22 the flow hash to assist with load balancing, although this step is optional or could instead be performed later if preferred. To compute the flow hash a decision as to which fields uniquely identify a flow should have been identified (For example, as indicated above these could be Protocol, Source Address, Destination Address, Source Port and Destination Port.

Those fields that are interchanged when the packets are flowing in the opposite direction should be identified, for example, the Source Address and Destination Address would be swapped, as would the Source Port and Destination Port. An arbitrary decision can be made whether to swap the interchangeable fields for the "upload" direction or the "download" direction, and then the flow hash can be computed by applying a one-way hash function to the fields that uniquely identify a flow, swapping the interchangeable fields of the packet in the one direction. The result should be the same for any packet in the flow traveling in either direction.

For example, if there is a TCP connection between host A address 10.0.0.1 port 1111 and host B address 10.0.0.2 port 2222. The flow hash could be computed as follows:

| Protocol | source | Destination | Direction | Flow Hash Computation |
|---|---|---|---|---|
| TCP | 10.0.0.1:1111 | 10.0.0.2:2222 | download | hash(TCP, 10.0.0.1, 10.0.0.2, 1111, 2222) |
| TCP | 10.0.0.2:2222 | 10.0.0.1:1111 | upload | hash(TCP, 10.0.0.1, 10.0.0.2, 1111, 2222) |

A random number is optionally generated 23 which can be used in association with the sample rate. The random number could be generated at a different step if preferred.

The network device 11 compares 24 the parsed data from the packet headers and packet payload, against a matching table. The matching table should be defined to match the packets of interest, and should at least include the identifying packet. The sample rate could also be configured in the matching table, or it could be configured elsewhere. The matching table could be split up into several different tables, possibly with varying fields to match against. In each scenario the matching table determines if a packet is of interest. Fields can be tested for matching using exact, ternary, range or other matching methods.

If the data matches, the random number could be used with the sample rate to determine if the packet will be sampled 25 and analysed. This can be done in a number of ways. For example, if the random number is given as a number between 0 and 1024, and the sample rate is 50%, then if the random number is below 512 the packet is sampled, and if the random number is greater than 512 it is not sampled.

The flow hash is then optionally matched 26 against the output table to determine which analysis device 12 the packet is to go to, and then the packet is transferred to the destination analysis server 12. This specific method of load balancing is optional. An alternative is that a single analysis device 12 is used, or a separate load balancing mechanism is used.

Variations to this process will also depend on the implementation. For example, if the load balance was undertaken with a different method then computing and using the flow-hash and output would not be necessary. Similarly, if for a small network the sample rate was 100% there would be no need to generate the random number. In addition rather than using a random number, 1 in every N (for example, N>1) packets could be selected instead.

Analysis Device

The analysis device 12 can be configured to perform a range of tasks. According to an embodiment, the primary use discussed above is to handle identifying packets and reconstruct flow information from sampled data.

Assuming that the configuration of the matching table described above is available to the analysis device 12 then the analysis device 12 should have enough information to build up the data needed. If the matching table is not available then preferably the packet will have been encapsulated with the applied sampling rate information. The analysis device 12 can determine what sampling rate was applied to the packet and use that to extrapolate out the number of packets in the flow and/or the size of the flow. The analysis device 12 can also try and read the contents of any identifying packets to identify more information about the flow. The metadata about the flow itself can be held in a cache so that it can be updated as more flow packets arrive, and an expiry mechanism on the cache could be used to detect a flow terminating.

There are a number of alternatives that could be employed. For example, if desired the analysis device functions could be split into and performed by separate components. The flow information may not be stored in a cache and could be sent to a data store for correlation by another process. And flow termination could also be detected by looking more deeply at the packet contents for example for TCP FIN packets.

According to an embodiment, the analysis device 12 is configured to estimate the size of the flow (packet count and total size in bytes) from the sampled packets it is provided. This estimation can be performed in several different ways. Preferably, the analysis device 12 will have at a minimum the sampled packets delivered, and also knowledge of what probability/sample rate each packet was extracted.

The analysis device 12 (or some component) may also examine the identifying packets to pull out that information and add that to the metadata of the flow.

Accordingly, in an embodiment, the analysis device 12 will receive a sampled packet and determine the sample rate/probability with which it was extracted. Once it has this data the analysis device 12 will update the packet flow metadata based on packet contents (e.g. identifying packets), and estimate of flow packet count and flow total size. For example, in a simple approach, with a 20% sampling rate applied, the analysis device 12 could add 5 to the packet count and 5× the packet size to the total size. That is, the data analysed by the analysis device 12 is extrapolated out to estimate the result had the sample rate been 100%.

In looking at the packet contents the analysis device 12 can determine if there is any additional useful information that can be extracted. For example, for a HTTP packet the analysis device 12 can check if it is a GET, POST, PUT, PATCH, DELETE, OPTIONS, HEAD or TRACE request and extract out the Host accordingly. Similarly, for a HTTPS packet the analysis device 12 could check if it is a handshake packet with Client Hello or Server Hello and extract out the Server Name Indication or Certificate Common Name.

Sampling Approach

According to an embodiment, a low sampling rate is applied to all packets (such as for example 4%), and in addition all identifying packets are sampled. Provided the sampling rate is sufficient for the network traffic profile (typically 4% to 5%), the sample size from the total packet population will yield a good estimate of the true packet count and size of each flow. Briefer and smaller flows will be less accurate than long-lived larger flows. However, network operators are generally more interested in the long-lived larger flows as they have the most impact on the network. Evidence of the smaller flows will still be seen by the extraction of their identifying packets.

By extracting all identifying packets, as configured by the system operator, the present invention can extract out the packets of interest from a flow without having to process the entire flow.

Figure 15:
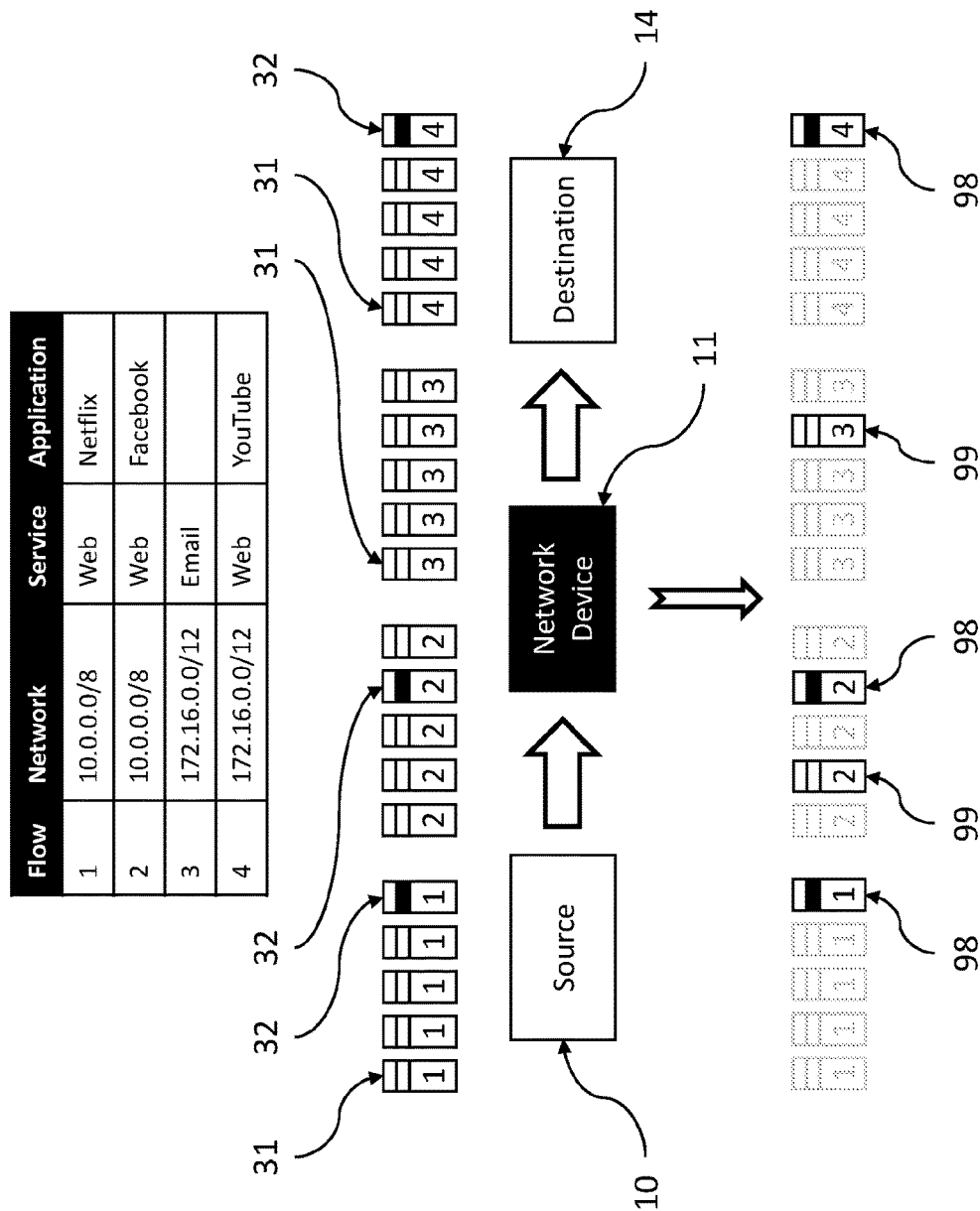
FIG. 15 exemplifies the approach of the present invention.

A representation of this can be seen in FIG. 15, which shows a source 10 sending packets to a destination 14. The network device 11 of the present invention sits in the middle, and selectively extracts packets.

In the example there are four flows each with five packets 31 (although, more generally, each flow may have any number of packets), with each flow numbered 1, 2, 3 and 4. Flows 1, 2 and 4 contain identifying packets 32. Note that only one (or relatively few in proportion to the number of other packets in the flow) packet is an identifying packet and the rest of the flow isn't of interest in this application.

A traditional solution would need to inspect and process all 4×5=20 packets in order to analyse the data. However, by randomly sampling some packets and sampling all identifying packets, the present invention can achieve a similar result without having to process all 20 packets. In this case the network device 11 still inspects all 20 packets, however in the example given only 5 packets end up with the analysis device 12, being all of the identifying packets 98 and some randomly sampled packets 99.

Figure 1:
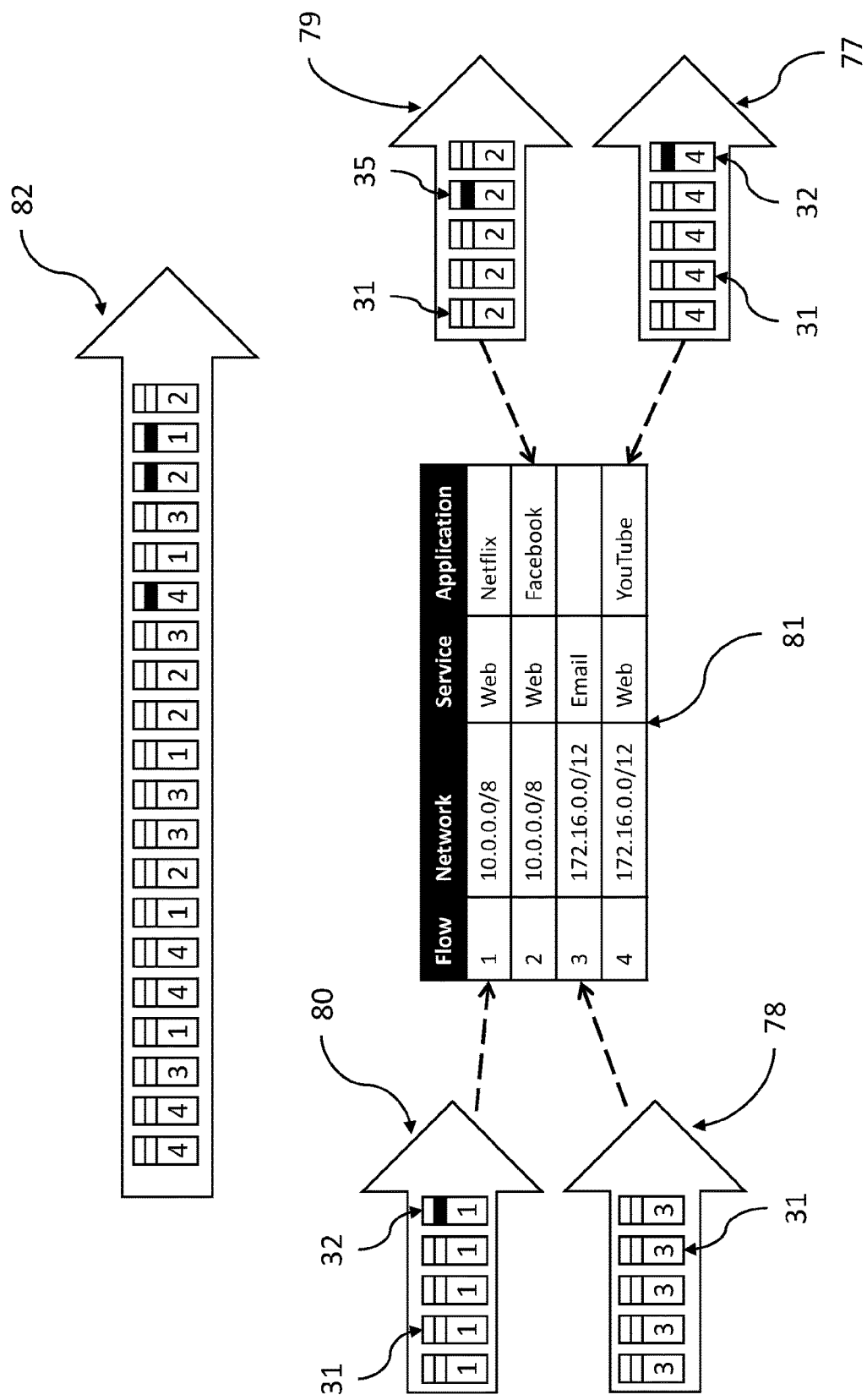
FIG. 1 shows an example scenario.
Figure 2:
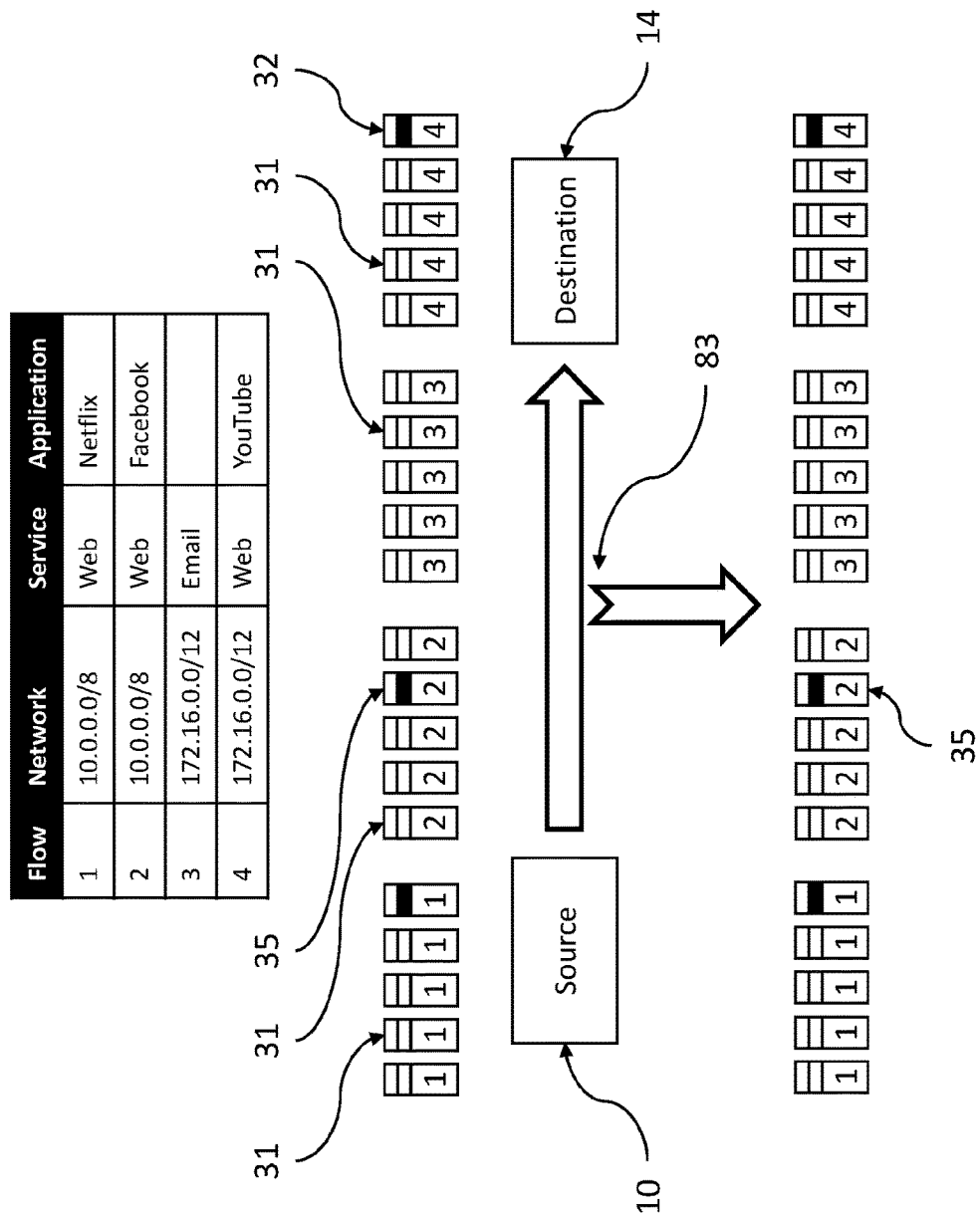
FIG. 2 shows one possible solution to the scenario of FIG. 1 using brute force.
Figure 3:
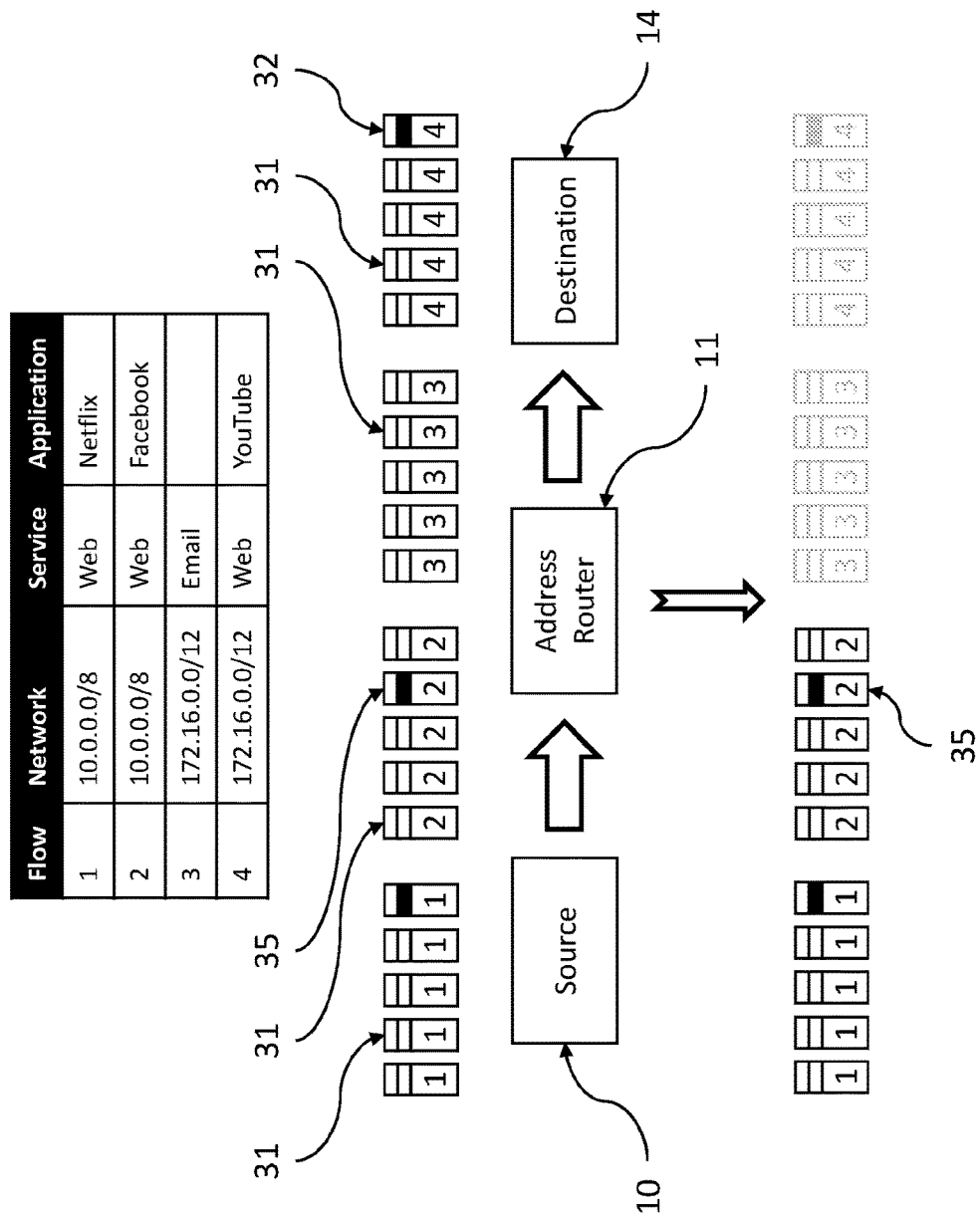
FIG. 3 shows another possible solution to the scenario of FIG. 1 using address routing.
Figure 4:
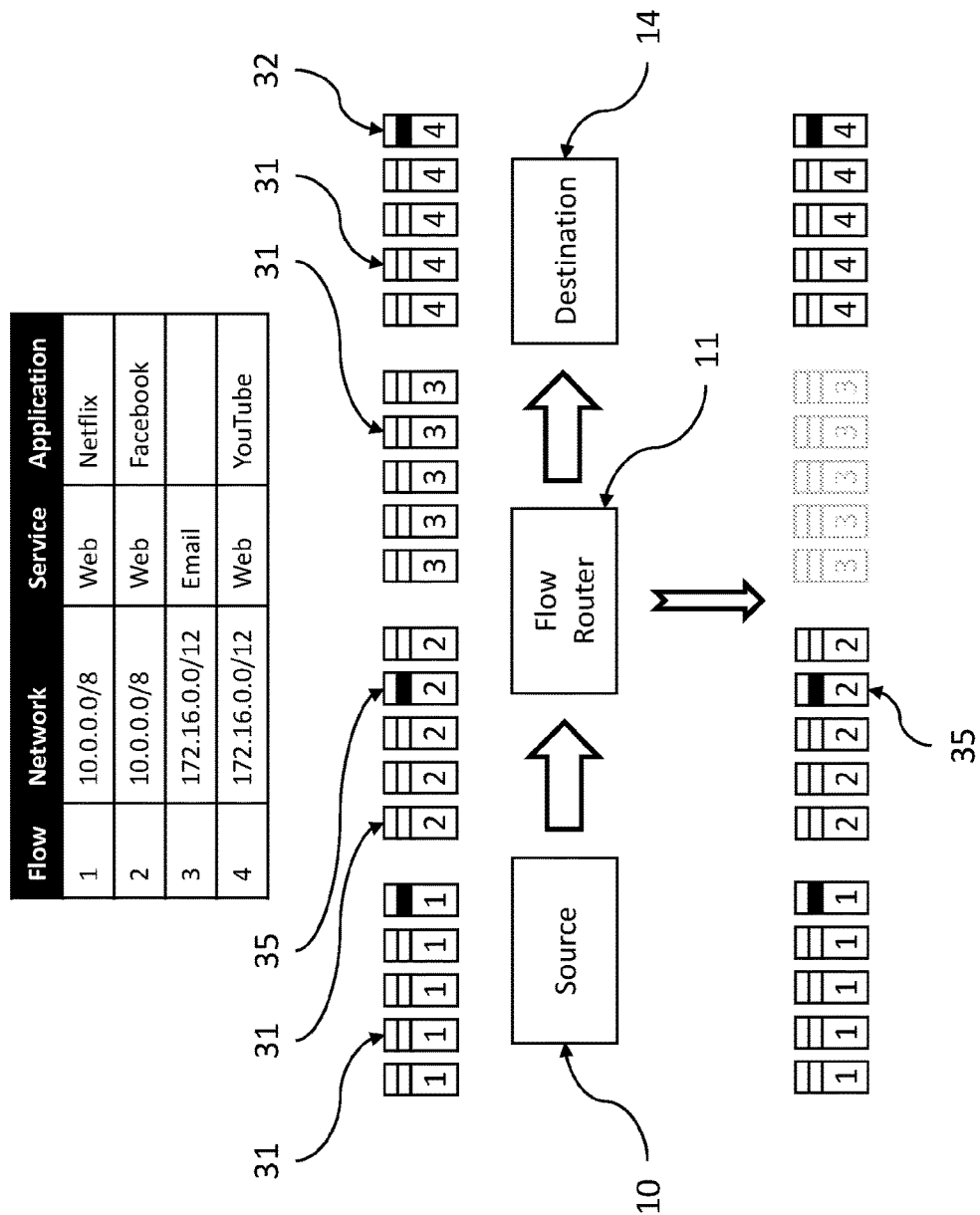
FIG. 4 shows another possible solution to the scenario of FIG. 1 using flow routing.
Figure 16:
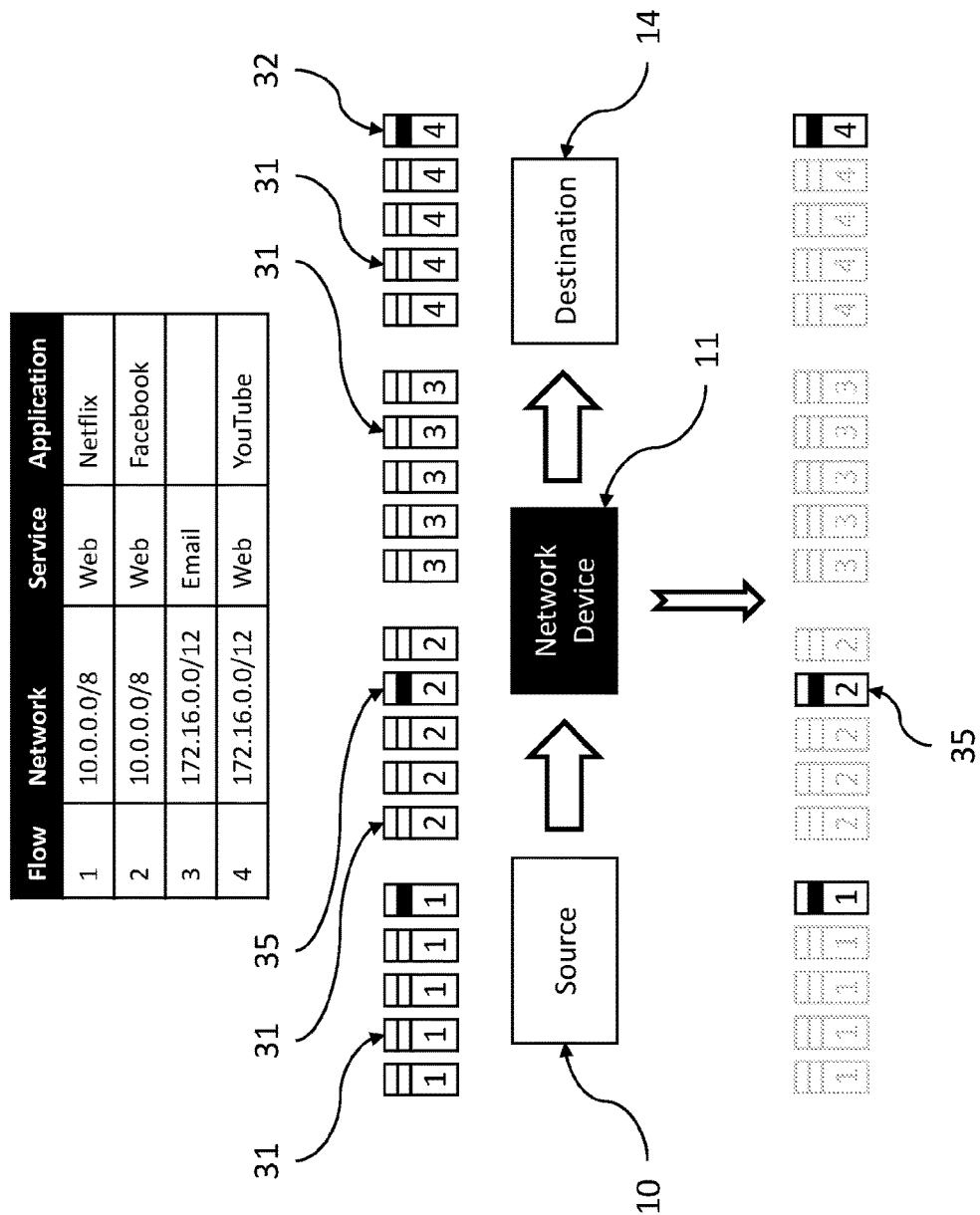
FIG. 16 shows a possible solution to the scenario of FIG. 1 using the present invention.

Returning to the example of FIG. 1, and the goal to identify Facebook usage, the present invention provides an ideal tool. As shown in FIG. 16, the present invention receives the source 10 data, detects each of the identifying packets 32 for analysis, and is then able to locate the Facebook identifying packet 35. In this example, 3 packets were sent for analysis which compares very favourably with the 20 packets that needed to be analysed in the example of FIG. 2.

Figure 5:
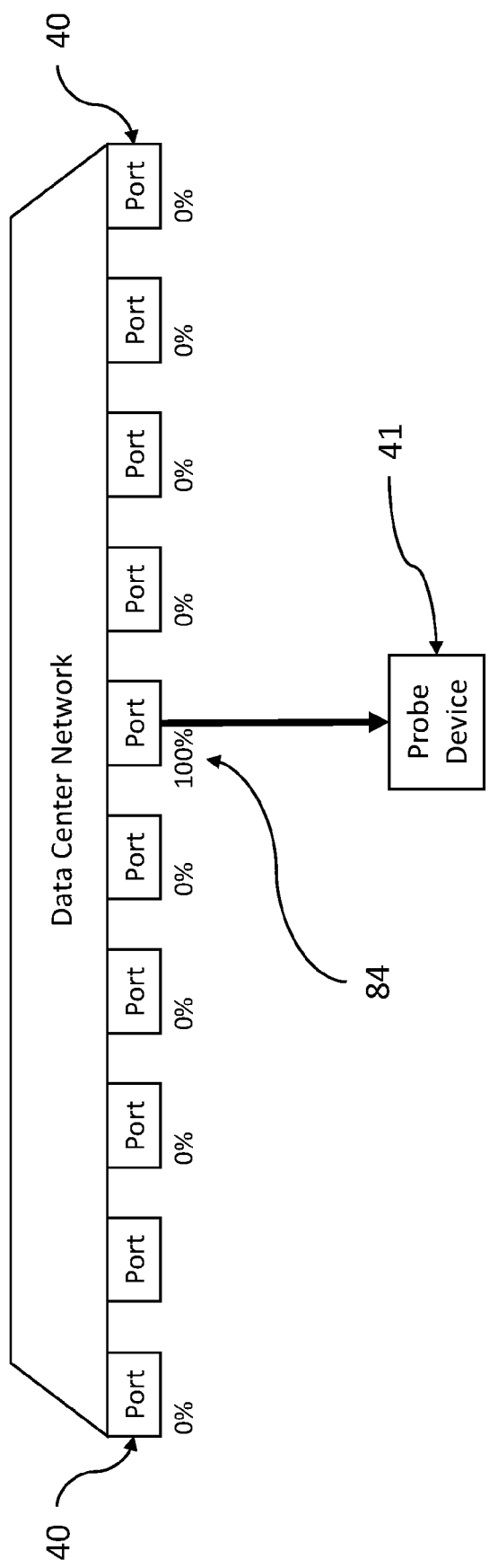
FIG. 5 shows a network diagnostic approach using a manual probe.
Figure 6:
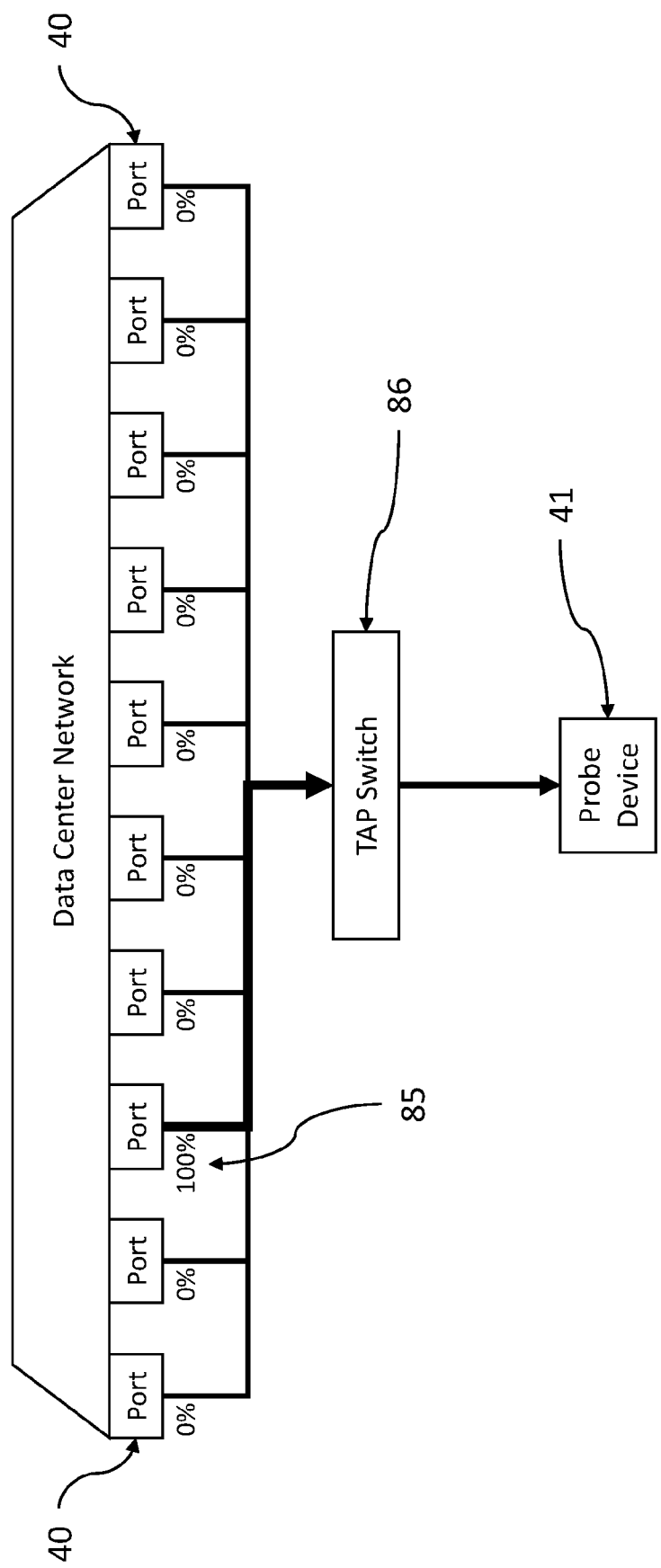
FIG. 6 shows an alternative approach to FIG. 5 using a TAP switch.
Figure 7:
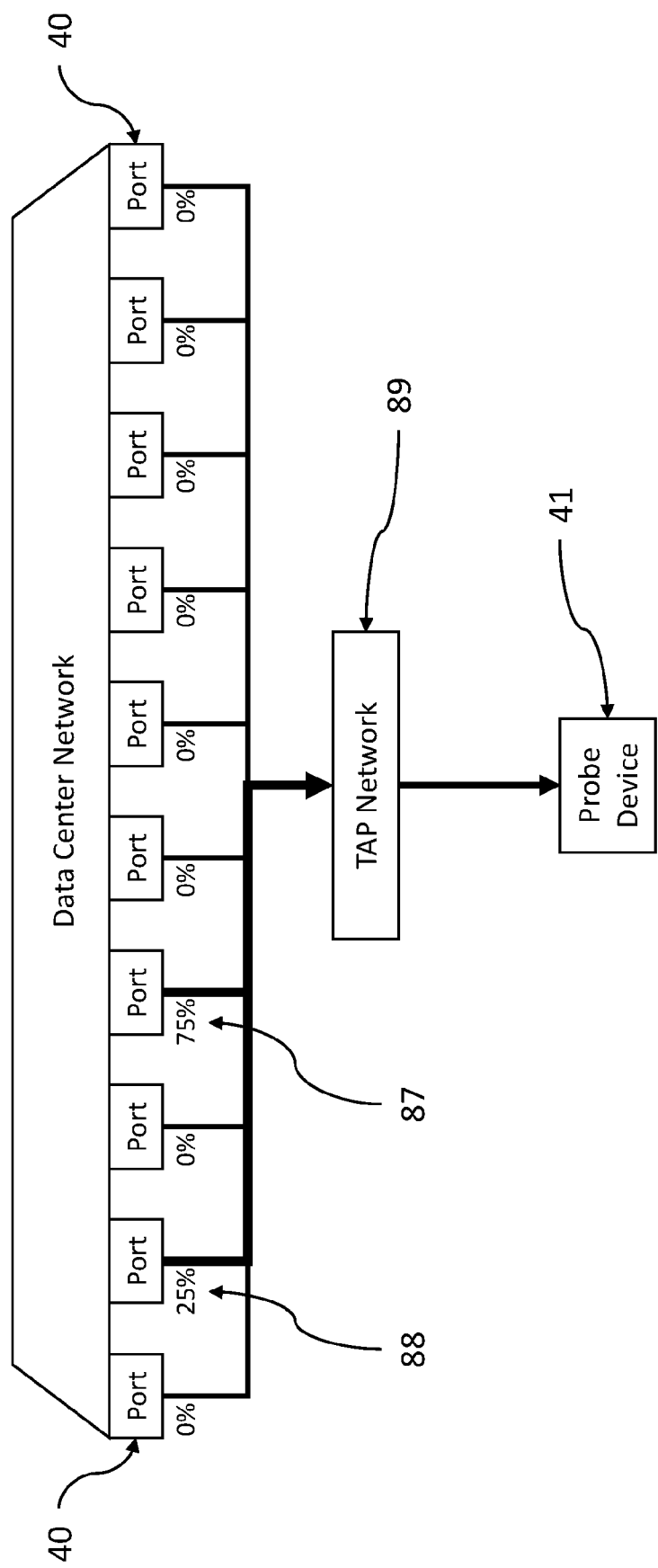
FIG. 7 shows another alternative approach to FIG. 5 using a TAP network.
Figure 17:
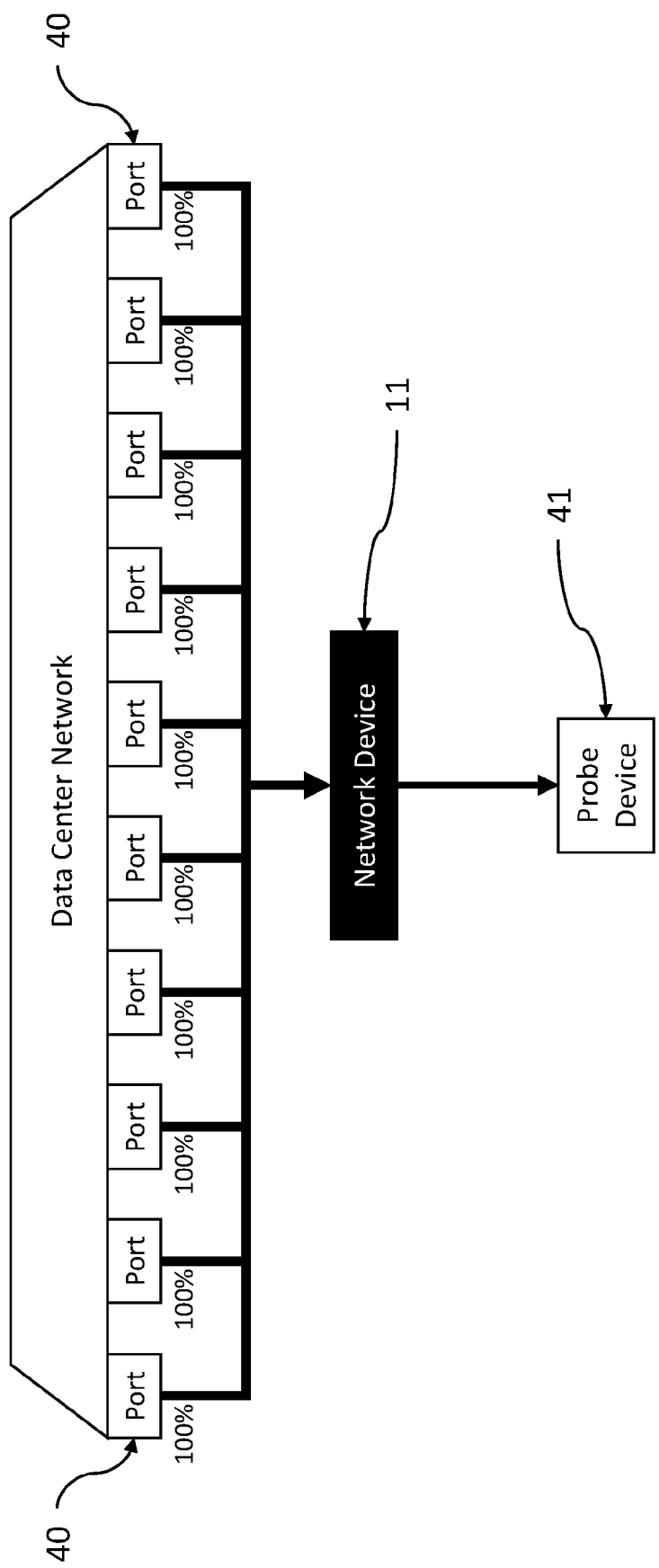
FIG. 17 shows an alternative approach to FIG. 5 using the present invention.

Similarly, the present invention may provide significant improvement in analysing traffic flow. The examples of FIGS. 5 to 7, show the limitations faced by network operators, or more the point their inability to monitor all of a networks internal traffic. Adopting the approach exemplified in FIG. 15 of selecting identifying packets 98 and random packets 99, an improved approach to network monitoring can be seen in FIG. 17. In this scenario all the ports 40 are attached to a network device 11 of the present invention, which in turn can be connected to a diagnostic probe device 41. This approach allows the network operator to identify all of the internal traffic on the network. By analysing the identifying packets the system can identify the applications running on the network. The system can also provide data feeds for intrusion detection, application monitoring, traffic analysis and network diagnostics.

This data can be of certain assistance in traffic management. A general goal of traffic management is to improve the customer experience, and in particular during peak times. Large elephant flows such as software updates, which are generally not critical, can consume much of the available bandwidth for extended periods of time. This can have the effect of blocking mice flows such as web browsing traffic. For the ultimate consumer this can mean delays in web pages loading, and blame is commonly attributed to the service provider.

By adopting the present invention undesirable elephant flows that are bandwidth heavy can be identified and a Quality of Service (QoS) policy can be applied to limit their effect. For example, a distinction could be made between game play and game downloads of a popular online game. Once the distinction is made the game downloads, and not game play, could be rate limited so as to achieve bandwidth savings and allowing other data to travel more freely across the network. Similarly, other software and operating system updates could be limited to ensure mice flows are not negatively impacted.

Figure 18:
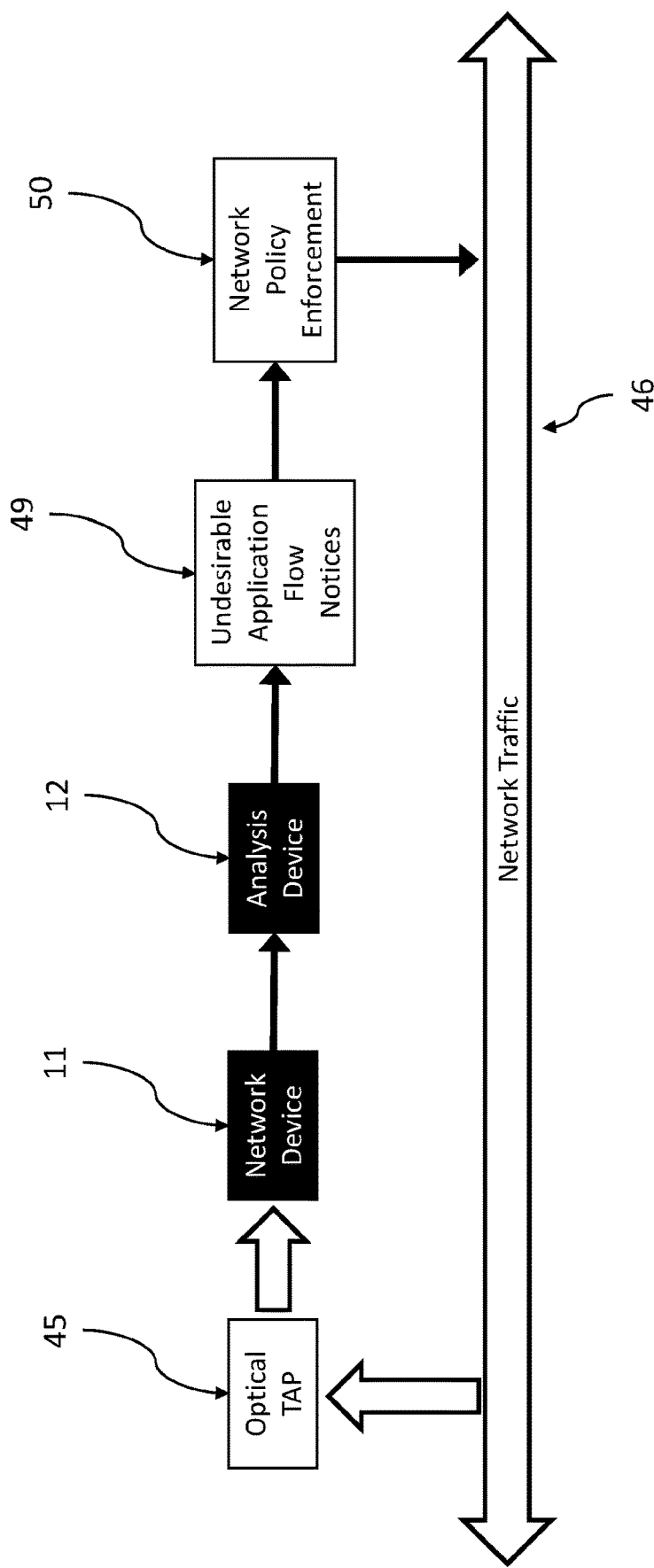
FIG. 18 shows a possible traffic management approach using the present invention.

This could be achieved through the configuration shown in FIG. 18. The optical TAP 45 can take an out-of-line copy of all the upload and download traffic 46, and feed this to the network device 11 of the present invention. The network device 11 detects all the identifying packets and forwards these to an analysis device 12 for packet inspection. Samples of a percentage of remaining packets can also be sent.

The analysis device could be an x86 and performs packet inspection on the received packets to fingerprint applications. It can also track flow counters and detect elephant flow start and finish events. The elephant flows can be matched against a table of undesirable applications, and if a match is detected an undesirable application flow notice 49 can be sent to network policy enforcement 50. The network policy enforcement 50 can then flow rate limit the offending application, or take any other remedial action that may be selected. For example, elephant flows could be marked to be placed in low priority queues.

The present invention advantageously may address a scale problem. That is, it may overcome the technical limitations of current technology which is not able to view all the data of a network or expand to encompass the whole of a network. The present invention can filter network packets at line-rate, relatively low cost and high scale. Something existing systems are not able to achieve.

Compared to a network packet broker, the present invention provides a unique combination of features including random sampling of packets from flows that match criteria and extraction of packets from flows that match criteria, where the criteria includes packets headers as well as part of the packet payload. Existing network packet brokers cannot perform both these functions unless they are connected to some other device. Relying on such a connection would mean that they could not operate at the data centre network switch speeds. The present invention is able to operate both of these features at line-rate speeds.

In addition matching against packet payload in commercial network packet brokers is typically limited to the first 128 bytes of the packet, whereas the present invention allows a much deeper match in excess of 300 bytes.

The present invention could be deployed at-scale across an entire network as a network packet broker with the added benefits of providing analysis of network traffic at scale. It can therefore be used to proactively identify network problems, gather flow metadata records for analysis and feeding into security systems, provide protocol (DHCP, DNS) data extraction in real-time and provide network visibility at a new level of detail.

Compared to a standalone DPI appliance, the present invention does not rely upon receiving a complete copy of a given packet stream, but rather only extracts out the packets of interest and a random sample of other packets of interest. The present invention can see every packet but does not have the processing overhead requirement of the DPI appliance.

Like a standard flow based network switch (e.g. OpenFlow), the present invention is capable of counting streams/flows in terms of the number of packets and byte sizes. However, flow based network switches are limited in the number of concurrent flows they can handle, typically only a few million. Once the flow based network switch exhausts its limited flow table memory, the switch will evict other active streams from its flow table, leading to a churn, which places additional load on the SDN (software-defined networking) controllers of the switch. In short, flow based switches do not work at scale. However, the present invention is able to scale up as needed.

While the present embodiment has been described in the context of a switch or a filter, the core of the invention is the extraction of identifying packets from a data stream. This coupled with the extraction of samples of other packets from the stream, enables an analyser to derive the data required for a particular implementation. For example, the application may be to monitor traffic flowing through a network so as to proactively manage the available bandwidth. An alternative may be to monitor traffic from a source or to a destination, or the effect of a particular application on the network. In a further alternative it could be used to limit the dissemination of undesirable information, such as that for example, from known terrorist groups. These applications cannot currently be undertaken except in a largely token effort. The ability of the present invention to extract the identifying packets, along with a random sample of packets, significantly reduces the data to be analysed but without relying on most of the data being bypassed. A person skilled in the art will appreciate that the core invention could be used for many different applications as noted above.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment.

Moreover, in interpreting the disclosure, all terms should be interpreted in the broadest reasonable manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

In this specification, terms such as 'switch, 'server, 'port', 'processor', and so forth, unless otherwise required by the context, should be understood as referring to a range of possible implementations of devices, apparatus and systems comprising a combination of hardware and software.

Furthermore, the particular features, structures, or characteristics may be combined in any suitable manner in one or more combinations. It will be appreciated that persons skilled in the art could implement the present invention in different ways to the one described above, and variations may be produced without departing from its spirit and scope.

Any discussion of documents, devices, acts or knowledge in this specification is included to explain the context of the invention. It should not be taken as an admission that any of the material forms part of the prior art base or the common general knowledge in the relevant art, in any country, on or before the filing date of the patent application to which the present specification pertains.

What is claimed is:

1. A network device comprising a processor and a computer readable medium comprising computer-readable instructions which when executed by the processor cause the device to:
   receive network data packets, each network data packet comprising a packet header and a packet payload;
   filter said network data packets according to predefined criteria, said filtering comprising inspection of at least a portion of the packet payload of the received network data packets and identifying at least one identifying packet in which the inspected portion of the respective packet payload satisfies the predefined criteria, and wherein received network data packets not satisfying the predefined criteria are identified as non-identifying packets;
   sample said non-identifying packets to select at least one sample packet according to a sampling rule; and
   transfer the at least one identifying packet and the at least one sample packet to an analyser.

2. The device of claim 1, wherein the processor comprises a programmable application specific integrated circuit.

3. The device of claim 1, wherein the network device operates exclusively in the data plane.

4. The device of claim 1, wherein the sampling rule comprises a predetermined sample rate determining the number of sample packets.

5. The device of claim 1, wherein said analyser carries out deep packet inspection on received packets, said received packets comprising the said at least one identifying packet and said at least one sample packet.

6. The device of claim 5, wherein said analyser estimates flow information of said network data packets from said received packets and said predetermined sample rate.

7. The device of claim 1, wherein the computer-readable instructions further cause the device to transfer the at least one identifying packet and the at least one sample packet to a load balancer, the load balancer determining which one of at least two analysers the at least one identifying packet and the at least one sample packet are to be transferred to.

8. The device of claim 3, wherein said predetermined sample rate is about 4% or 5%.

9. The device of claim 1, wherein the sampling rule defines said at least one sample packet at random.

10. The device of claim 1, wherein the sampling rule defines selecting each Nth network data packet, where N is a predetermined number, as a sample packet.

11. A network traffic device comprising:
   at least one network device operating exclusively in a data plane, said at least one network device adapted to:
   receive network data packets, each network data packet comprising a packet header and a packet payload;
   filter said network data packets according to predefined criteria, said filtering comprising inspection of at least a portion of the payload of the received network data packets and identifying at least one identifying packet in which the inspected portion of the respective packet payload satisfies the predefined criteria, and wherein received network data packets not satisfying the predefined criteria are identified as non-identifying packets;
   sample said non-identifying packets to select at least one sample packet according to a sampling rule;
   transfer the at least one identifying packet and the at least one sample packet to at least one analyser;

and
at least one analyser, adapted to perform deep packet inspection on received packets, said received packets comprising the said at least one identifying packet and said at least one sample packet.

12. The device of claim 1, wherein said filtering further comprises inspection of at least a portion of the packet header of the received network data packets and identifying at least one identifying packet in which both the inspected portion of the respective packet payload and the inspected portion of the packet header satisfies the predefined criteria.

13. The device of claim 1, wherein said filtering comprises inspection of at least a first six bytes of the packet payload.

14. The network traffic device of claim 11, wherein the at least one network device comprises a programmable application specific integrated circuit.

15. The network traffic device of claim 11, wherein the sampling rule comprises a predetermined sample rate determining the number of sample packets.

16. The network traffic device of claim 15, wherein said predetermined sample rate is about 4% or 5%.

17. The network traffic device of claim 11, wherein said analyser is adapted to estimate flow information of said network data packets from said received packets and said predetermined sample rate.

18. The network traffic device of claim 11, further comprising a load balancer and at least two analysers, and wherein the network device is further adapted to transfer the at least one identifying packet and the at least one sample packet to the load balancer, and wherein the load balancer is adapted to determine which one of the at least two analysers the at least one identifying and the at least one sample packet are to be transferred to.

19. The network traffic device of claim 11, wherein said filtering further comprises inspection of at least a portion of the packet header of the received network data packets and identifying at least one identifying packet in which both the inspected portion of the respective packet payload and the inspected portion of the packet header satisfies the predefined criteria.

20. The network traffic device of claim 11, wherein said filtering comprises inspection of at least a first six bytes of the packet payload.

* * * * *